United States Patent
Zeh et al.

(10) Patent No.: US 8,332,091 B2
(45) Date of Patent: Dec. 11, 2012

(54) METHOD FOR OPERATING A HYBRID DRIVE

(75) Inventors: Dietmar Zeh, Tamm (DE); Holger Rapp, Ditzingen (DE); Thomas Pauer, Freiberg (DE); Markus Rueckle, Stuttgart (DE); Werner Teschner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 71 days.

(21) Appl. No.: 12/947,455

(22) Filed: Nov. 16, 2010

(65) Prior Publication Data

US 2011/0118923 A1 May 19, 2011

(30) Foreign Application Priority Data

Nov. 17, 2009 (DE) .......................... 10 2009 046 747

(51) Int. Cl.
 *B60L 9/00* (2006.01)
(52) U.S. Cl. .............. 701/22; 180/165; 180/65; 701/60; 701/661; 701/103; 701/104; 477/3; 477/9; 123/295; 123/431; 123/674; 475/5

(58) Field of Classification Search ..................... 701/22, 701/60, 661, 103, 104; 475/5; 477/3, 9; 60/712; 74/661; 123/295, 431, 674; 180/165, 180/65.22, 65.23, 65.25, 65.265, 65.28, 65.285
See application file for complete search history.

(56) References Cited

U.S. PATENT DOCUMENTS

| | | | |
|---|---|---|---|
| 6,014,962 A * | 1/2000 | Sato et al. ..................... | 123/674 |
| 6,442,455 B1 * | 8/2002 | Kotre et al. ..................... | 701/22 |
| 6,657,315 B1 * | 12/2003 | Peters et al. .................. | 290/40 C |
| 7,150,266 B2 * | 12/2006 | Nakayama et al. ........... | 123/431 |
| 2007/0107417 A1 * | 5/2007 | Surnilla et al. ................. | 60/285 |
| 2009/0126352 A1 * | 5/2009 | Surnilla et al. ................. | 60/288 |

FOREIGN PATENT DOCUMENTS

DE 10 2008 000 911 10/2009

* cited by examiner

*Primary Examiner* — Behrang Badii
*Assistant Examiner* — Jelani Smith
(74) *Attorney, Agent, or Firm* — Kenyon & Kenyon LLP

(57) ABSTRACT

A method for operating a hybrid drive of a motor vehicle in particular. An internal combustion engine is connected to a generator via a force-conducting connection. In a learning mode, the generator is operated as a motor and drives the internal combustion engine. In this learning mode, a so-called zero quantity calibration is performed.

25 Claims, 1 Drawing Sheet

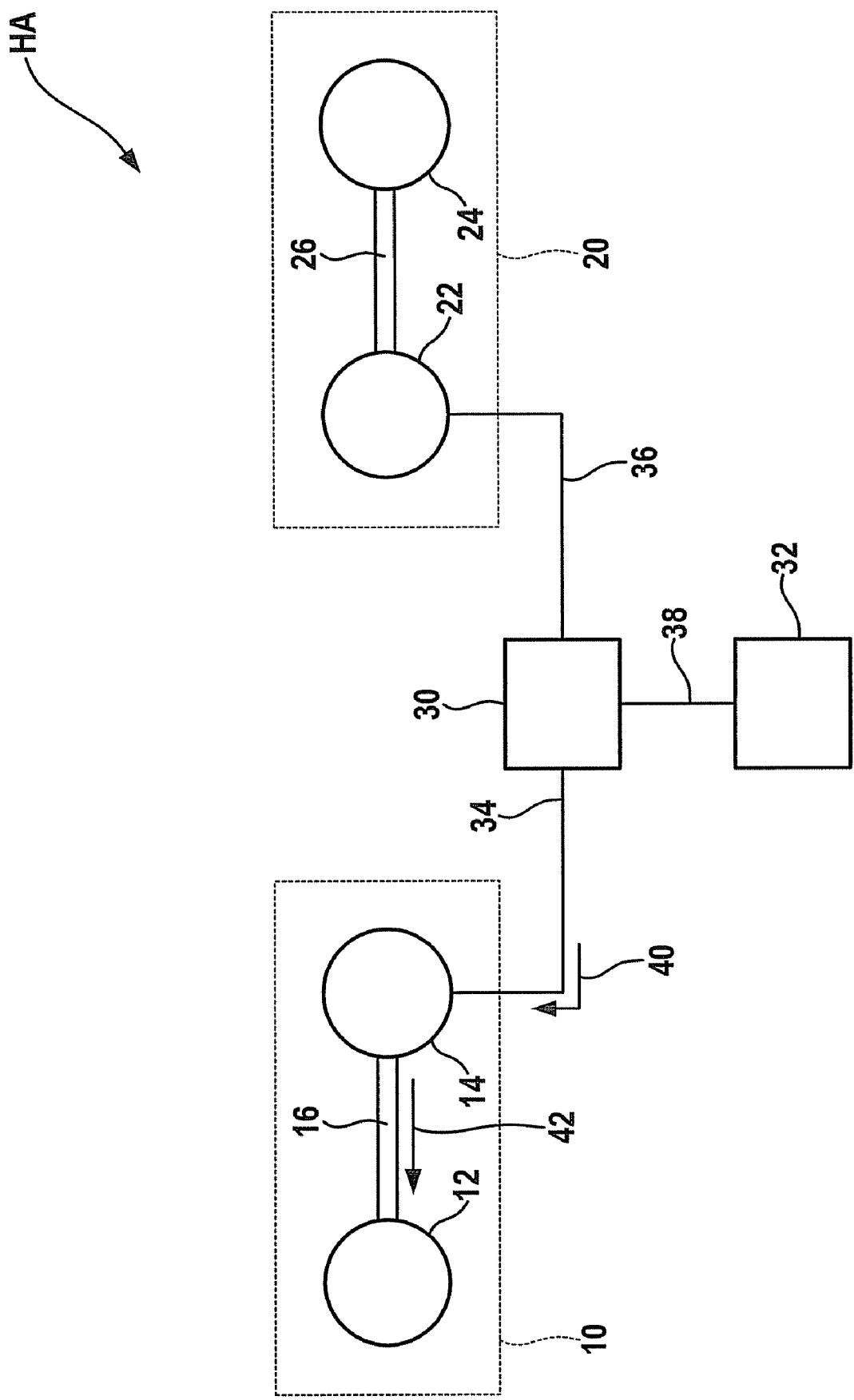

METHOD FOR OPERATING A HYBRID DRIVE

FIELD OF THE INVENTION

The present invention relates to a method for operating a hybrid drive, in particular a motor vehicle.

BACKGROUND INFORMATION

Serial hybrid drives which drive a motor vehicle via an electric motor are known. The electric power for the electric motor is supplied to the internal combustion engine via a generator.

In addition, there are known motor vehicles which are driven by only an internal combustion engine. For these vehicles it is also known that a coasting phase, i.e., passive driving of the internal combustion engine, is used to perform a so-called zero quantity calibration. This involves ascertaining and adjusting operating parameters of the internal combustion engine to the extent that the operating parameters in a normal operation of the internal combustion engine, i.e., at a drive torque generated by the internal combustion engine, result in a compensation of age drift and optimization of the efficiency of the internal combustion engine.

There is no coasting phase with the serial hybrid drive mentioned above. To this extent, no zero quantity calibration may be performed.

SUMMARY OF THE INVENTION

In the method according to the present invention, the generator is operated as a motor in a learning mode and drives the internal combustion engine. The zero quantity calibration is performed in this mode.

During normal operation, the internal combustion engine thus drives the generator to supply electric power to the electric motor or to the battery. In the method according to the present invention, however, the internal combustion engine is driven by the generator to ascertain and/or adjust the operating parameters for normal operation.

In an advantageous specific embodiment of the method, the driven internal combustion engine essentially does not apply any driving torque to the generator during the learning mode. This achieves the result that the learning mode corresponds approximately to the coasting operation mentioned above. The learning mode may thus readily be used for zero quantity calibration.

In a particularly advantageous specific embodiment of the method, it is provided that a small quantity of fuel is metered into a combustion chamber of the internal combustion engine and ignited. The change in torque of the internal combustion engine is measured and the operating parameter(s) for normal operation of the internal combustion engine is/are ascertained and/or adjusted accordingly. Age drift of the individual components of the internal combustion engine is compensated by ascertaining/adjusting, i.e., optimizing the operating parameters.

This method yields an increased efficiency of the internal combustion engine during normal operation associated with fuel savings and also reduced emissions.

In an advantageous specific embodiment of the method, the operating parameters are ascertained/adjusted only as soon as the internal combustion engine is hot, i.e., as soon as it has reached a certain temperature. This ensures that the operating parameters that are as optimal as possible for normal operation are ascertained.

In an advantageous refinement of the method, the operating parameters are ascertained/adjusted only when increased or reduced rotational irregularities not originating from the internal combustion engine are less than a certain extent. This avoids falsification of the ascertained/adjusted operating parameters by a rotational irregularity acting on the internal combustion engine from the outside. This ensures ascertaining/adjusting of optimal operating parameters.

In another advantageous specific embodiment of the method, the operating parameters are ascertained/adjusted only when a rail pressure of a common rail system has stabilized. This further improves the ascertaining/adjusting of optimal operating parameters.

BRIEF DESCRIPTION OF THE DRAWING

FIG. 1 schematically shows a serial hybrid drive of a motor vehicle.

DETAILED DESCRIPTION

Serial hybrid drive HA in FIG. 1 includes essentially a power supply unit 10 and a drive unit 20. Power supply unit 10 includes an internal combustion engine 12 and a generator 14. Internal combustion engine 12 and generator 14 are connected via a force-conducting connection 16. Drive unit 20 includes an electric motor 22 and a drive train 24. Electric motor 22 and drive train 24 are connected via a force-conducting connection 26.

A power transmission unit 30 is connected to generator 14, electric motor 22, and a battery 32 via electric lines 34, 36 and 38. Generator 14, electric motor 22, and battery 32 may be operated as energy sources and also as energy sinks.

The purpose of power supply unit 10 is to supply electric power to vehicle units, for example, drive unit 20. Generator 14 is therefore driven by internal combustion engine 12. Generator 14 converts the mechanical energy coming from internal combustion engine 12 into electric power and sends it to power transmission unit 30.

Drive unit 20 provides the drive for the motor vehicle. Electric motor 22 is therefore supplied with electric power by power transmission unit 30. Electric motor 22 converts the electric power into mechanical energy. The mechanical energy is applied to drive train 24. Drive train 24 transfers the mechanical energy to a drive path of the motor vehicle.

Power transmission unit 30 controls and/or regulates the flow of electric power between generator 14, electric motor 22 and battery 32. If energy is required by the electric motor, for example, electric power is supplied from an energy source via power transmission unit 30.

Various operating modes of the hybrid drive according to FIG. 1 are explained below.

A vehicle drive mode pertaining to power supply unit 10, drive unit 20, and battery 32 is characterized in that the motor vehicle is moved by drive unit 20 relative to the drive path of the motor vehicle. Battery 32 and/or power supply unit 10 may be considered as energy sources for the drive. Power supply unit 10 is in normal operation when operated as an energy source. For example, electric motor 22 is supplied mainly by power supply unit 10, and battery 32 is connected when performance peaks are required.

In a battery charging mode pertaining to power supply unit 10, drive unit 20 and battery 32, battery 32 is charged by input of electric power, usually primarily via power supply unit 10.

A braking mode is a submode of the battery charging mode and is characterized in that the motor vehicle is decelerated, i.e., its speed relative to the roadway is reduced. In the braking mode, electric motor 22 may be operated as a generator and may generate electric power. The energy thereby generated is stored in battery 32.

A learning mode pertaining to power supply unit 10 and battery 32 is characterized in that energy is supplied to generator 14 according to arrow 40 in FIG. 1. Accordingly, generator 14 is operated as a motor. Generator 14 supplies mechanical energy to internal combustion engine 12 according to arrow 42 and thus drives internal combustion engine 12. In the learning mode, driven internal combustion engine 12 acts upon force-conducting connection 16 and thus on generator 14 with essentially no driving torque.

A zero quantity calibration is performed in the learning mode. Internal combustion engine 12 is controlled and/or regulated in such a way that small quantities of fuel are injected into the combustion chambers of internal combustion engine 12 and ignited. In addition, the effect of the small quantities of fuel injected, for example, in the form of a minor change in torque on a force-conducting connection, is measured, for example, the effect on force-conducting connection 16. This method is used to ascertain and/or adjust operating parameters for normal operation of the internal combustion engine on the basis of the quantity of fuel injected and the particular change in torque.

The learning mode is performed only when the engine is hot. To this end, internal combustion engine 12 must have reached a certain temperature. In addition, the learning mode is performed only if the rotational speed dynamic is limited inasmuch as increased or reduced rotational irregularities not originating from internal combustion engine 12 act upon internal combustion engine 12 only to a limited extent.

The operating parameters are ascertained and/or adjusted in a rotational speed range between a starting rotational speed and a maximum rotational speed with respect to internal combustion engine 12. An ideal rotational speed for ascertaining the operating parameters is the rotational speed at which the internal combustion engine is running during normal operation.

In the case of a common rail injection system, the rail pressure is also taken into account. In other words, the operating parameters are ascertained and/or adjusted when a rail pressure has stabilized.

During the learning mode, drive unit 20 may operate autonomously. For example, if enough electric power is available from battery 32, power supply unit 10 is not necessarily needed to supply power.

The methods described here are usually executed as computer programs capable of running on a control unit. The control unit is usually designed as a microcontroller and programmed according to methods described here. Furthermore, a corresponding computer program is stored in a memory medium.

What is claimed is:

1. A method for operating a hybrid drive, an internal combustion engine being connected to a generator via a force-conducting connection, the method comprising:
   operating the generator in a learning mode as a motor, the generator driving the internal combustion engine;
   igniting a small quantity of fuel metered into a combustion chamber of the internal combustion engine in the learning mode;
   measuring a change in torque on the force-conducting connection from the metered and ignited fuel quantity in the learning mode; and
   performing a zero quantity calibration in the learning mode, wherein substantially no driving torque is supplied to the generator by the internal combustion engine in the learning mode.

2. The method according to claim 1, wherein the hybrid drive is of a motor vehicle.

3. The method according to claim 1, further comprising:
   withdrawing the power required to drive the internal combustion engine from a battery in the learning mode.

4. The method according to claim 1, wherein substantially no driving torque is supplied to the generator by the internal combustion engine in the learning mode.

5. The method according to claim 1, wherein a small quantity of fuel is metered into a combustion chamber of the internal combustion engine and ignited in the learning mode.

6. The method according to claim 5, further comprising:
   measuring an effect of the metered and ignited fuel quantity on a rotational movement of the internal combustion engine.

7. The method according to claim 6, wherein the measurement is performed on the force-conducting connection.

8. The method according to claim 1, wherein the learning mode is performed only when an operating temperature of the internal combustion engine has been reached.

9. The method according to claim 1, wherein the learning mode is performed only when rotational irregularities not originating from the internal combustion engine have dropped below a threshold.

10. The method according to claim 1, wherein the learning mode is performed only when a behavior of a pressure over time, including a rail pressure of the internal combustion engine, has reached a substantially steady state.

11. A control unit for operating a hybrid drive, an internal combustion engine being connected to a generator via a force-conducting connection, the control unit comprising a processor for:
   operating the generator in a learning mode as a motor, the generator driving the internal combustion engine;
   igniting a small quantity of fuel metered into a combustion chamber of the internal combustion engine in the learning mode;
   measuring a change in torque on the force-conducting connection from the metered and ignited fuel quantity in the learning mode; and
   performing a zero quantity calibration in the learning mode, wherein substantially no driving torque is supplied to the generator by the internal combustion engine in the learning mode.

12. The control unit according to claim 11, wherein the hybrid drive is of a motor vehicle.

13. A non-transitory computer-readable medium containing a computer program which, when executed by a processor, performs a method for operating a hybrid drive, an internal combustion engine being connected to a generator via a force-conducting connection, the method comprising:
   operating the generator in a learning mode as a motor, the generator driving the internal combustion engine;
   igniting a small quantity of fuel metered into a combustion chamber of the internal combustion engine in the learning mode;
   measuring a change in torque on the force-conducting connection from the metered and ignited fuel quantity in the learning mode; and
   performing a zero quantity calibration in the learning mode, wherein substantially no driving torque is supplied to the generator by the internal combustion engine in the learning mode.

14. The computer-readable medium according to claim 13, wherein the hybrid drive is of a motor vehicle.

15. The method according to claim 1, further comprising:
withdrawing the power required to drive the internal combustion engine from a battery in the learning mode;
wherein substantially no driving torque is supplied to the generator by the internal combustion engine in the learning mode.

16. The method according to claim 15, wherein the learning mode is performed only when an operating temperature of the internal combustion engine has been reached.

17. The method according to claim 15, wherein the learning mode is performed only when rotational irregularities not originating from the internal combustion engine have dropped below a threshold.

18. The method according to claim 15, wherein the learning mode is performed only when a behavior of a pressure over time, including a rail pressure of the internal combustion engine, has reached a substantially steady state.

19. The method according to claim 15, wherein the hybrid drive is of a motor vehicle.

20. The method according to claim 15, wherein a small quantity of fuel is metered into a combustion chamber of the internal combustion engine and ignited in the learning mode, and wherein an effect of the metered and ignited fuel quantity on a rotational movement of the internal combustion engine is measured.

21. The method according to claim 20, wherein the measurement is performed on the force-conducting connection.

22. The method according to claim 20, wherein the learning mode is performed only when an operating temperature of the internal combustion engine has been reached.

23. The method according to claim 20, wherein the learning mode is performed only when rotational irregularities not originating from the internal combustion engine have dropped below a threshold.

24. The method according to claim 20, wherein the learning mode is performed only when a behavior of a pressure over time, including a rail pressure of the internal combustion engine, has reached a substantially steady state.

25. The method according to claim 20, wherein the hybrid drive is of a motor vehicle.

* * * * *